United States Patent [19]

Bahr et al.

[11] 4,170,779

[45] Oct. 9, 1979

[54] PRINT HEAD ELECTRODE FOR METAL PAPER PRINTERS

[75] Inventors: Dietrich J. Bahr; Karl H. Burckardt, both of Herrenberg; Wilhelm G. Spruth, Dagersheim, all of Fed. Rep. of Germany

[73] Assignee: International Business Machines Corporation, Armonk, N.Y.

[21] Appl. No.: 867,405

[22] Filed: Jan. 6, 1978

[30] Foreign Application Priority Data

May 2, 1977 [DE] Fed. Rep. of Germany ....... 2719506

[51] Int. Cl.[2] .......... G01D 15/16

[52] U.S. Cl. .......... 346/139 C; 400/121; 219/216; 204/290 R

[58] Field of Search .......... 400/1 R, 120, 121, 124; 101/93.04, 93.05; 219/216; 346/76 R, 139 C; 427/117, 118, 123, 125; 204/280, 290 R, 291–293

[56] References Cited

U.S. PATENT DOCUMENTS

| | | | |
|---|---|---|---|
| 2,346,675 | 4/1944 | Hackenberg et al. | 346/139 C X |
| 2,607,654 | 8/1952 | Ridings et al. | 346/139 C |
| 2,957,315 | 10/1960 | Wood | 346/76 R |
| 3,204,249 | 8/1965 | Shaler et al. | 346/139 C |
| 3,419,886 | 12/1968 | Ortlieb | 346/76 R |
| 3,683,412 | 8/1972 | Priessnetz | 346/139 C |
| 3,774,229 | 11/1973 | Blackwood | 346/139 C |
| 3,808,675 | 5/1974 | Iayama et al. | 29/592 |
| 3,811,030 | 5/1974 | Veach | 346/76 R |
| 3,846,802 | 11/1974 | Kyotani et al. | 346/139 C X |
| 3,911,447 | 10/1975 | Ortlieb | 346/139 C X |
| 3,995,281 | 11/1976 | Perilhou | 346/76 R X |

FOREIGN PATENT DOCUMENTS

| | | | |
|---|---|---|---|
| 1403063 | 5/1965 | France | 346/139 C |
| 857466 | 12/1960 | United Kingdom | 346/139 C |

*Primary Examiner*—E. H. Eickholt
*Attorney, Agent, or Firm*—K. P. Johnson

[57] ABSTRACT

Sheathed electrode for metal paper printer in which the core is of material having a higher melting point than the encasing material. This arrangement permits the use of electrodes having smaller cross-section and attainment of finer resolution since only the core is effective during marking.

1 Claim, 1 Drawing Figure

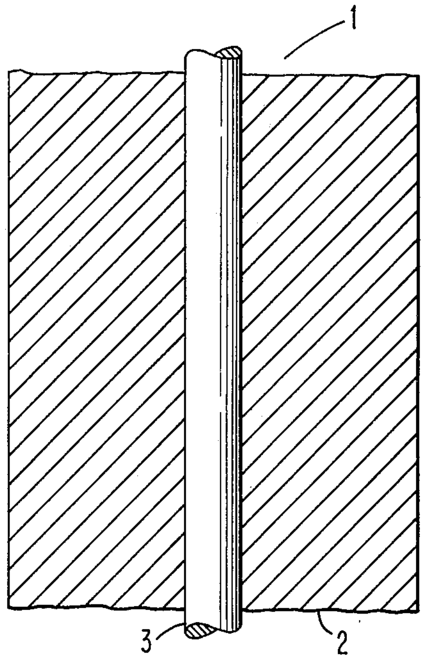
1
2
3

PRINT HEAD ELECTRODE FOR METAL PAPER PRINTERS

BACKGROUND OF THE INVENTION

The invention relates to a print head electrode for maximum resolution metal paper printers.

In metal paper printers (electroerosion printers) a metal coated record carrier is printed upon with the aid of an electrode print head. The print head can comprise one or several individually controllable electrodes which are in contact with the metal surface of the record carrier. As one of the electrodes is energized, the metal coating of the record carrier is evaporated at the contact point between the electrode and the record carrier, so generating a visible image element. By suitably controlling the various electrodes and by advancing the print head across the record carrier, text and graphic image information are visibly recorded.

During this process, the resolution of the print image is a function of the image element size which, in turn, is a function of the cross-section dimensions of the print electrode. For high resolution print images the use of very thin electrodes is indispensable. However, the facilities of producing such electrodes are limited.

On the one hand, it is not possible to draw very thin electrodes from a bare electrode wire, and on the other hand it is not possible to produce such print electrodes by etching (cf. also German Offenlegunsschrift OS 21 62 438). Apart from the problems connected with the production of fine print electrodes, the application of such very thin print electrodes is uncertain. Generally, print electrodes are embedded in the supporting material of the print head.

To ensure perfect contact between the electrodes and the record carrier and for wear reasons, the electrodes must protrude from the supporting material of the print head. In the case of very fine electrodes, this requirement could not be met, since even if the electrodes protruded from the supporting material only very slightly, their mechanical buckling or bending strength would be insufficient. Because of this, they would have to be embedded in the supporting material almost to their tips, which would be impracticable because of the high wear encountered.

To counteract the wear problem, it is possible, as previously proposed, to guide thin electrodes of adequate mechanical stability in glass tubes. For feed reasons, however, this solution is unsuitable for extremely thin electrodes because of their insufficient mechanical stability.

Therefore, it is the object of the invention to provide for maximum resolution metal paper printer electrodes whose mechanical stability is such that it permits them to protrude sufficiently from the supporting material of the print head body or to be reliably refed, if and when required.

A further object of this invention is to provide a composite electrode for metal paper printers comprising two materials with differing melting points and wear characteristics for improved mask resolution and electrode life.

SUMMARY OF THE INVENTION

The foregoing objects are attained in accordance with the invention by providing a small diameter core electrode encased in a sheath of supporting material. The core electrode is a conductor having a melting point higher than the encasing material and having better wear resistance. During operation, marks are formed only by the core, thus enabling fine resolution.

The foregoing and other objects, features, and advantages of the invention will be apparent in the following more particular description of a preferred embodiment of the invention as illustrated in the accompanying drawing.

DESCRIPTION OF PREFERRED EMBODIMENT

An embodiment of the invention is shown in the drawing and will be described in detail below. The drawing is a sectional view of a sheathed electrode.

In the FIGURE, the print electrode 1 is an electrode core 3 surrounded by a sheath 2. Core 3, similar to conventional bare print electrodes, is made of a conductive metal having a relatively high melting point and sheath 2 is of a metal having a relatively low melting point. The difference in the high and low melting points can be more than 1000° C. For example, the core can be of tungsten (m.p. of about 3400° C.) or molybdenum (m.p. of about 2600° C.). The sheath, for example, can be nickel (m.p. of about 1450° C.), copper (m.p. of about 1100° C.), silver (m.p. of about 960° C.), or Wood's alloy (m.p. of about 70° C.). The core has a very small diameter ($<50$ μm), as is desirable for maximum resolution electrodes and such a sheath renders the electrodes sufficiently strong. How electrodes thus sheathed are manufactured will be described further on.

It was found that the low melting sheath material does not affect the printing process performed with the aid of the high melting print core, i.e., the cross-sectional area of the sheath does not increase the generated image element whose size is solely a function of the effective cross-section of the print core, because during print core 3 is bared as a result of its surrounding sheath material evaporating.

As the low melting sheath, (low melting in comparison to the high melting point of the material—tungsten or molybdenum—surrounding core 3), materials such as nickel, silver, copper or Wood's alloy, can be used, whose properties are such that they meet the requirements of the evaporation process and the requirements to be fulfilled during the manufacture of sheathed electrodes.

Thin wires or thin wire electrodes up to a thickness of about 5 μm can be drawn in a conventional manner from bare wire material. For reasons of mechanical strength, print head electrodes, as tests have shown, must have a diameter of $>50$ μm. Therefore, cylindrical electrodes were not suitable for higher image resolutions. Assuming the electrode spacing to be adequate, said minimum diameter of the print electrodes is attributable to the fact that the electrodes must protrude from the surrounding print head body by a certain amount, in order to reliably overcome the peak-to-valley height of the record carrier, i.e., to permit evaporation of the so-called "valleys". (The peak-to-valley heights are of the order of 0.5 μm in the case of Mylar and about 20 μm in the case of rough raw paper).

Electrodes produced from thin tungsten or molybdenum foils by etching are limited with regard to their dimensions by the strength of the foil raw material. Tungsten foils are available from about 25 μm onwards and molybdenum foils from about 10 μm. The problems connected with thin electrodes produced by etching are similar to those encountered with electrodes produced by drawing.

Thin electrodes, desirable for extremely high resolutions, such as thin tungsten wires with a diameter of <5 μm cannot be drawn in a conventional manner from a thicker bare wire. Thin wires (of 3 to 10 μm diameter), could be produced in a conventional manner by silver-coating thicker tungsten wires and by subsequently reducing the thickness of the wires thus sheathed in a drawing step. Subsequently, the silver sheath would be chemically removed in a conventional manner, so baring the very fine tungsten core. The thin tungsten wires thus obtained were used for the production of incandescent lamps and tubes; they are now used as almost invisible heating filaments in car rear windows and to armour thin plastic components or to produce very fine glass tubes.

Fine sheathed wires produced by conventional means can be used as print head electrodes in metal paper printers (without removing their sheathing, as is necessary with conventional applications) and permit the generation of maximum resolution print images. At the very small core diameter necessary for resolutions of that order, sheathed electrodes have an overall diameter which ensures that their mechanical stability is adequate during printing. Because of this, the sheathed electrodes can protrude from the supporting material of the print head by an adequate amount. In addition, the mechanical strength of such sheathed electrodes, provided they are guided in the print head body, allows them to be reliably refed. The core of the electrode preferably consists of tungsten or molybdenum, since such metals have a high melting point and an adequate mechanical strength which permit them to be used for the production of very thin wires.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electrode for marking an erodible recording member in an electroerosion printer comprising:

an electrically conductive core material in contact with said member having a first melting point and selected from the group consisting of tungsten or molybdenum having a cross-section of less than 50 μm, supported in a sheath of consumable, electrically conductive material selected from the group consisting of silver, nickel, copper or Wood's alloy, said sheath being substantially coextensive with said core and having a second melting point lower than said first melting point.

* * * * *